United States Patent [19]

Kim et al.

[11] Patent Number: 5,376,606
[45] Date of Patent: Dec. 27, 1994

[54] LIGHT-TRANSMISSIVE POLYCRYSTALLINE ALUMINA CERAMICS

[75] Inventors: Yoon H. Kim, Seoul; Jae K. Park, Chunlanam-Do; Dong K. Lim, Kyungki-Do; Hee B. Kang, Seoul, all of Rep. of Korea

[73] Assignee: Korea Institute of Science and Technology, Seoul, Rep. of Korea

[21] Appl. No.: 176,089

[22] Filed: Dec. 30, 1993

[51] Int. Cl.$^5$ ............................................. C04B 35/10
[52] U.S. Cl. .................................... 501/153; 501/127; 264/65; 264/66
[58] Field of Search ............... 501/153, 127, 105, 119; 264/65, 66

[56] References Cited

U.S. PATENT DOCUMENTS

| | | | |
|---|---|---|---|
| 4,222,978 | 9/1980 | Oda et al. | 501/153 X |
| 4,285,732 | 8/1981 | Charles et al. | 501/153 X |
| 4,725,467 | 2/1988 | Groh et al. | 501/153 X |
| 4,762,655 | 8/1988 | Rhodes et al. | 501/153 X |

Primary Examiner—Karl Group
Attorney, Agent, or Firm—Darby & Darby

[57] ABSTRACT

A light-transmissive alumina ceramic composition and a method for preparing the same are disclosed. The light-transmissive polycrystalline alumina ceramics composition comprises of 100 w/o of aluminum oxide having a purity of not less than 99.99%, approximately 0.03 to approximately 0.1 w/o of magnesium compound and approximately 0.002 to approximately 0.07 w/o of zirconium compound. The method is comprised of the steps of: molding mixture powder consisting of 100 w/o of aluminum oxide powder having a purity of not less than 99.99% added with from approximately 0.03 to approximately 0.1 w/o of magnesium oxide powder and from approximately 0.002 to approximately 0.07 w/o of zirconium oxide powder to obtain a molded substance; calcining said molded substance under the atmosphere to give a calcined substance having a strength suitable to processing; grinding the surface of said calcined substance smoothly; and sintering the resulting substance in a hydrogen atmosphere or a vacuum. The light-transmissive polycrystalline ceramics composition is preventive of the reflection and scattering of light. With the method for producing light-transmissive polycrystalline ceramics, the workability and the production yield are improved.

2 Claims, No Drawings

LIGHT-TRANSMISSIVE POLYCRYSTALLINE ALUMINA CERAMICS

BACKGROUND OF THE INVENTION

1. Field of the Invention

The present invention relates, in general, to light-transmissive polycrystalline alumina ceramics mainly used for a light-transmissive alumina luminous tube of high voltage sodium lamp and, more particularly, to a light-transmissive alumina ceramic composition and a method for preparing the same, capable of improving the light-transmission and the workability of polycrystalline alumina ceramics.

2. Description of the Prior Art

Since light-transmissive alumina ceramics, in general, show good transmissivity to visible lights and infra-red lights and have superior or thermal, mechanical, chemical properties and preferred electric stability, they are mainly used as materials for luminous tube of high voltage lamp and for window for infra red sensor.

The light transmissivity of polycrystalline alumina ceramics is determined by its surface roughness, size and uniformity of crystalline particle, void ratio, and impurity content. That is to say, a light passing through polycrystalline alumina ceramics reflects or scatters at the surface thereof, the surface of particle constituting it, the void and the impurity contained therein, and as the path of the light becomes lengthy due to the reflection and scattering, there is effected lower transmissivity of light, consequently.

In order to improve the light transmissivity, many efforts have been made to prevent the reflection and scattering. For example, the reflection and scattering caused by particle surface, void and impurity may be reduced by using highly pure raw material and by controlling additives and sintering conditions. In addition, the reflection and scattering at the surface of ceramics can be prevented by smoothly polishing the surface of ceramics.

As methods for polishing light-transmissive alumina ceramics, there have been used two types, that is, a chemical polishing method and a mechanical polishing method.

The chemical polishing method, which was developed by G. E. Scott, Jr, et al, comprises of treating light-transmissive alumina ceramics in a sodium borate solution having temperatures ranging from 762° to 857° C., removing impurities attached to the surface of the alumina ceramics with fluoric acid (HF) and drying it in the air, so as to obtain smooth surface.

However, the chemical polishing method is difficult to apply to mass production for an article of complex shape, such as light-transmissive alumina luminous tube for high voltage sodium lamp, since it is complicate and requires much time.

On the other hand, the mechanical polishing method comprises of applying an grinding process and a cutting process to the surface of the sintered, light-transmissive alumina ceramics and polishing mechanically to smooth the surface.

Since the sintered substance of alumina ceramics is extensively hard, considerable load is needed to carry out the mechanical polishing method. This considerable load may damage the alumina ceramics and effect minute cracks therein, so that it acts as a factor that causes poor qualities in an article produced, such as deterioration of article reliability.

SUMMARY OF THE INVENTION

For solving the problems encountered in the prior arts, the present inventors have recognized that there exists a need for a light-transmissive polycrystalline ceramics composition, preventive of the reflection and scattering of light and for a method for producing light-transmissive polycrystalline ceramics, capable of increasing the workability and the production yield.

Therefore, it is an object of the present invention to provide a light-transmissive polycrystalline alumina ceramics composition, free of void therein.

It is another object of the present invention to provide a light-transmissive polycrystalline alumina ceramics composition, uniform in phase on the surface of particle.

It is further an object of the present invention to provide a method for producing light-transmissive polycrystalline alumina ceramics, workable easily and obtainable of high yield.

In accordance with an aspect of the present invention, the above objects can be accomplished by providing a light-transmissive polycrystalline alumina ceramics composition, comprising of 100 w/o of aluminum oxide having a purity of not less than 99.99%, approximately from 0.03 to approximately 0.1 w/o of magnesium oxide and approximately from 0.002 to approximately 0.07 w/o of zirconium oxide.

In accordance with another aspect of the present invention, the above objects can be also achieved by providing a method for producing light-transmissive polycrystalline alumina ceramics, comprising the steps of: molding mixture powder consisting of 100 w/o of aluminum oxide powder having a purity of not less than 99.99% added with from approximately 0.03 to approximately 0.1 w/o of magnesium oxide powder and approximately from 0.002 to approximately 0.07 w/o of zirconium oxide powder to obtain a molded substance; calcining the molded substance under the atmosphere to give a calcined substance having a strength suitable to processing; grinding the surface of the calcined substance smoothly, and sintering the resulting substance in a hydrogen atmosphere or a vacuum.

DETAILED DESCRIPTION OF THE INVENTION

As an ingredient of the light-transmissive polycrystalline alumina ceramics composition according to the present invention, magnesium oxide is preferably added in an amount of from approximately 0.33 w/o to approximately 0.1 w/o, based on the highly pure aluminum oxide.

As another ingredient constituting the present light-transmissive polycrystalline alumina ceramics, zirconium oxide is preferably added in an amount of from approximately 0.002 w/o to approximately 0.07 w/o, based the base material.

For example, if too little magnesium oxide or zirconium oxide is used, the abnormal growth of crystalline particle are caused, generating voids therein. As a result, the transmissivity becomes lowered.

On the other hand, if too much magnesium oxide or zirconium oxide is added, a secondary phase appears at the surface of particle, acting as a factor that deteriorates the transmissivity.

Magnesium compound and zirconium compound used in the present invention may be added in a form of chlorides, carbonates or acetates thereof which are preforms of oxides, so as to provide the light-transmissive polycrystalline alumina ceramics. Preferred magnesium and zirconium compounds used in the present invention include oxides.

In accordance with the present invention, light-transmissive polycrystalline alumina ceramics are produced as follows: first, aluminum oxide, magnesium oxide and zirconium oxide that are on the order of the inventive composition ratios are mixed, pulverized in a wet manner, and then spray-dried, so as to give powders having an average particle size of approximately 80 μm; next, the powders are molded under pressure into a tube which is subsequently subjected calcination at 800° to 1,300° C. for 1 to 5 hours. Then, the calcined substance is polished with buff, such as nylon or cotton; and finally, the resulting calcined substance is sintered for 1 to 15 hours at temperatures that are increased to 1,750° to 1,900° C. in a rate of not less than 300° C./h.

In producing the inventive light-transmissive polycrystalline alumina ceramics, the calcination temperature is of great importance. For example, the calcination is carried out at temperature less than 800° C., only bonding agents burn out but there is little generated reactions among the ceramics particles. As a result of low calcination temperature, the strength of the calcined substance is rather lower than that of the molded substance and the calcined substance is apt to be brittle when polishing the surface thereof. On the other hand, in case that the calcination temperature is above 1,300° C., the reaction among the ceramics particles is fast proceeded, increasing rapidly the surface hardness of the calcined substance. It is hard to polish the surface of the substance calcined at high temperatures. Therefore, it is preferable to keep the calcination temperature ranging from approximately 800° to approximately 1,300° C.

The preferred embodiment of the present invention will now be further described with reference to specific examples.

EXAMPLE

Aluminum oxide powder of above 99.99% purity, having an average diameter of not more than 1 μm was added with magnesium oxide and zirconium oxide in the composition ratios given from the following Table 1. The resulting compositions were mixed in a wet manner and spray-dried, so as to obtain coarse particles with an average diameter of approximately 80 μm.

The coarse particles were molded in a dry-type hydrostatic pressure molding apparatus, consisting of tungsten carbide mandrel (WC mandrel) and polyurethane, under pressure of 2 ton/cm², in order to prepare cylindrical bodies.

The cylindrical bodies had interior surfaces as smooth as glass surface because the surfaces came into contact with the WC mandrel. On the other hand, the exterior surfaces of the cylindrical bodies were rough and coarse.

The molded, cylindrical bodies were subsequently subjected calcination at 1,000° C. for 2 hours and then were polished with nylon buff.

Following the polishing, the cylindrical bodies were sintered at 1,850° C. for 3 hours under pressure of $10^{-4}$ torr to produce light-transmissive alumina ceramics applicable to luminous tubes of 400 watt sodium lamp.

Average particle sizes, maximal surface roughness and linear transmissivity of the resulting light-transmissive alumina ceramics were measured and the results are given as shown in Table 1.

TABLE 1

Characteristics of light-transmissive alumina ceramics depending to composition and surface polishing.

| Sample No. | Main part (w/o) $Al_2O_3$ | Additives (w/o) MgO | Additives (w/o) $ZrO_2$ | Avg. particle size (μm) | Surface polishing | Max. surface roughness Rmax (μm) | Linear transmissivity (%) |
|---|---|---|---|---|---|---|---|
| 1 | 100 | 0.01 | 0.002 | >130-.0 | — | — | — |
| 2 | 100 | 0.03 | 0.002 | 30.1 | O | 3 | 7.5 |
| 3 | 100 | 0.03 | 0.002 | 30.1 | X | 12 | 1.3 |
| 4 | 100 | 0.03 | 0.05 | 32.0 | O | 4 | 7.3 |
| 5 | 100 | 0.03 | 0.05 | 32.0 | X | 13 | 1.1 |
| 6 | 100 | 0.05 | 0.05 | 32.6 | O | 3 | 7.3 |
| 7 | 100 | 0.05 | 0.05 | 32.6 | X | 11 | 1.2 |
| 8 | 100 | 0.05 | 0.03 | 33.4 | O | 3 | 7.4 |
| 9 | 100 | 0.05 | 0.03 | 33.4 | X | 12 | 1.2 |
| 10 | 100 | 0.07 | 0.05 | 34.2 | O | 4 | 7.6 |
| 11 | 100 | 0.07 | 0.05 | 34.2 | X | 13 | 1.3 |
| 12 | 100 | 0.07 | 0.03 | 33.5 | O | 4 | 7.5 |
| 13 | 100 | 0.07 | 0.03 | 33.5 | X | 12 | 1.2 |
| 14 | 100 | 0.07 | 0.07 | 35.0 | O | 3 | 7.4 |
| 15 | 100 | 0.07 | 0.07 | 35.0 | X | 13 | 1.3 |
| 16 | 100 | 0.10 | 0.05 | 35.8 | O | 3 | 7.2 |
| 17 | 100 | 0.10 | 0.05 | 35.8 | X | 13 | 1.3 |
| 18 | 100 | 0.10 | 0.07 | 36.2 | O | 3 | 7.3 |
| 19 | 100 | 0.10 | 0.07 | 36.2 | X | 14 | 1.2 |
| 20 | 100 | 0.10 | 0.10 | 37.2 | O | 3 | 2.8 |
| 21 | 100 | 0.10 | 0.10 | 37.2 | X | 14 | 1.1 |
| 22 | 100 | 0.15 | 0.07 | 38.0 | O | 3 | 2.1 |
| 23 | 100 | 0.15 | 0.07 | 38.0 | X | 14 | 1.0 |

From the Example and the Table, the light-transmissive polycrystalline alumina ceramics produced in accordance with the present invention have smooth surface with maximal surface roughness of not more than 4 μm and show good linear transmissivity of not less than 7%.

Whilst the present invention has been described with reference to certain preferred embodiments and examples, it will be appreciated by those skilled in the art that numerous variations and modifications are possible without departing from the spirit or scope of the invention as broadly described.

What is claimed is:

1. A method for producing a light-transmissive polycrystalline alumina ceramic, comprising the steps of:

molding a mixture including aluminum oxide powder having a purity of not less than 99.99% and from approximately 0.03 to 0.1 weight percent magnesium oxide powder and from 0.02 to 0.07 weight percent zirconium oxide powder to obtain a molded substance;

calcining said molded substance to obtain a calcined substance having a strength suitable for processing;

polishing the surface of said calcined substance smoothly; and sintering the resulting polished substance in an environment selected from the group consisting of a hydrogen atmosphere and a vacuum.

2. The method according to claim 1, wherein said calcination is performed at a temperature of from about 800° C. to 1,300° C. for between 1 and 5 hours.

* * * * *